United States Patent [19]

Ostler

[11] Patent Number: 5,550,853
[45] Date of Patent: Aug. 27, 1996

[54] INTEGRAL LASER HEAD AND POWER SUPPLY

[75] Inventor: Kevin D. Ostler, West Jordan, Utah

[73] Assignee: Laser Physics, Inc., Salt Lake City, Utah

[21] Appl. No.: 362,249

[22] Filed: Dec. 21, 1994

[51] Int. Cl.⁶ .................................................. H01S 3/04
[52] U.S. Cl. .............................. 372/34; 372/36; 372/61; 372/92
[58] Field of Search .......................... 372/92, 98, 34, 372/36; 371/61

[56] References Cited

U.S. PATENT DOCUMENTS

| | | | |
|---|---|---|---|
| 3,763,442 | 10/1973 | McMahan | 372/34 |
| 4,573,159 | 2/1986 | Aagano et al. | 372/34 |
| 4,625,317 | 11/1986 | Kolb et al. | 372/61 |
| 4,656,635 | 4/1987 | Baer et al. | 372/34 |
| 4,665,529 | 5/1987 | Baerf et al. | 372/92 |
| 4,697,269 | 9/1987 | Ohara | 372/34 |
| 4,723,257 | 2/1988 | Baer et al. | 372/92 |
| 4,727,554 | 2/1988 | Watanabe | 372/36 |
| 4,887,271 | 12/1989 | Taylor | 372/36 |
| 5,181,214 | 1/1993 | Berger et al. | 372/36 |
| 5,181,215 | 1/1993 | Sam et al. | 372/36 |

*Primary Examiner*—Leon Scott, Jr.
*Attorney, Agent, or Firm*—Workman Nydegger & Seeley

[57] ABSTRACT

An inventive system integrating a laser head and power supply in a novel fashion is described. The integral laser head and power supply utilizes a power supply heat sink which circumferentially surrounds the laser head. Also incorporated is a circuit board so sized and configured to allow for placement of the laser head therein. High technology components are also preferably employed to allow minimization of size and weight. The resulting integral laser head and power supply enjoys a significant reduction, approximately half, in both size and weight.

14 Claims, 4 Drawing Sheets

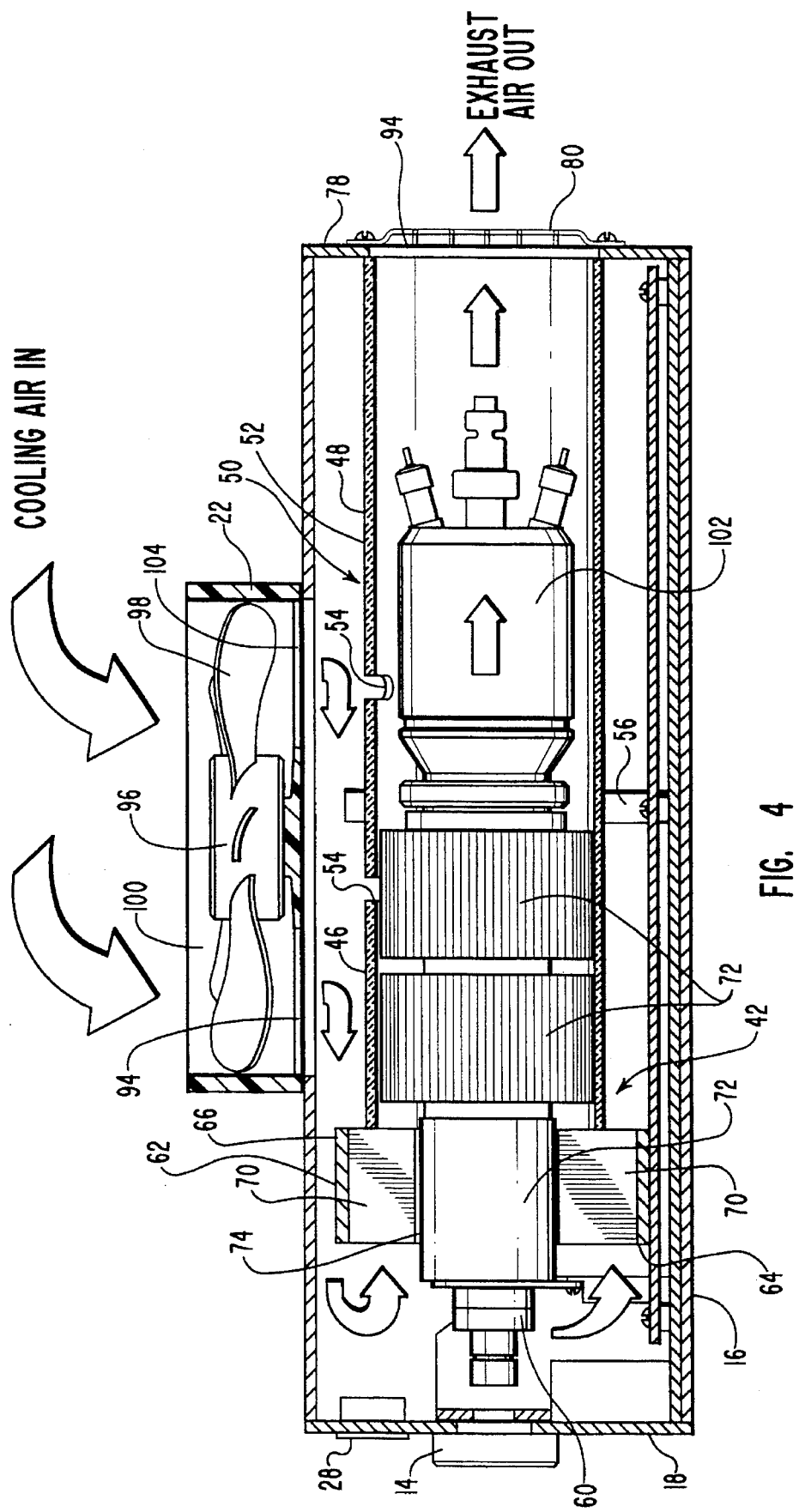

INTEGRAL LASER HEAD AND POWER SUPPLY

BACKGROUND OF THE INVENTION

1. The Field of the Invention

This invention relates generally to lasers and laser power supplies and more specifically to an integral laser head and power supply system.

2. Background

Lasers technology has increasingly been utilized in various applications in modern technology. Medical, dental, display and forensic technology have been among those to increasingly use such lasers. One type of laser finding application in expanding environments is the gas-discharge laser. Ion gas-discharge lasers are among those becoming increasingly popular.

Lasers in general, and ion gas lasers in particular, utilize similar components. A typical prior art laser head would include a plasma tube, a resonator, utilizing internal or external mirrors, a heat sink, an optical cavity, and a system for cooling of the laser head. The laser would be contained in a housing with the cooling fan designed to move air through the resonator and across the heat sink to cool the plasma tube.

In addition to the laser head, a power source is required to achieve the desired effect. The power source serves to inject energy into the system to achieve the desired population inversion. When this state is reached, the extra energy can be released as light which is then amplified as it bounces back and forth between the mirrors of the resonator. In a typical design, the mirrors of the resonator will be coated somewhat differently from each other so as to force the light to be emitted from one end and not the other.

Gas-discharge lasers achieve the population inversion required to lase by utilizing the non-equilibrium processes in a gas discharge. Such lasers can be used to produce a laser action at a variety of wavelengths by adjustment of the discharge conditions. A variety of wavelengths in the visible and near-ultraviolet ranges can be produced by Argon and Krypton ion gas-discharge lasers.

A typical prior art power supply would comprise a switching power supply which would incorporate a switching bridge and an isolation transformer. Cooling of the power supply may include a fan but, more commonly, is accomplished simply by incorporating slots in the housing to allow for venting of the system. Since the power supply typically runs at a much cooler temperature than the laser head, such a slotted housing design can provide adequate cooling.

The overwhelming majority of ion gas-discharge lasers designs will include a separate laser head and power supply as described above. The laser head and power supply will be mounted in individual housings with an interface cable connecting the two. One of the reasons for this configuration are the differing cooling needs of the laser head and the power supply. An additional cause of separate housings for the laser head and power supply has been the bulkiness of the components utilized.

A laser head typically requires more cooling than a power supply because, although the laser head can run at a higher temperature than the power supply, ion lasers are inefficient and produce a great amount of heat. For example, an ion laser head can typically operate up to 200° C. Conversely, the power supply cannot run at the high temperatures of the laser head but, at the same time, does not generate much heat and, therefore, requires less cooling. Power supplies typically can operate up to 70° C. before failure occurs.

For some laboratory applications, having separate laser head and power supply assemblies provides an adequate design if size and weight are not determining factors. In laboratory applications it would be common to mount the laser head precisely, perhaps on a vibration isolation table, and mount the power supply adjacent to the laser head. In such a situation, the separate housings for the laser head and power supply may cause no undue problems.

In other applications, however, the separate laser head and power supply design is less than satisfactory. As technology has advanced, lasers have become common in medical, dental, display, forensic and industrial applications. In such applications it is typically necessary to transport the laser from site to site or to remote locations. The time involved in setting up the laser head and power supply at each site can be substantial. In addition, the size, weight, and awkwardness are a nuisance at best.

As more and more applications for lasers evolve, however, the need for a portable laser system has increased. One attempt to provide a portable system has combined a laser head and a power supply into a single housing. This is basically accomplished by mounting a typical prior art laser head side by side with a typical prior art power supply and surrounding the entire device with a single housing. This provides a single unit but one which is rather unwieldy.

An example of a developing application of lasers is the use of ion lasers in curing dental restorative compounds. Although it would be possible to permanently set up a traditional laser system, with separate laser head and power supply, in a treatment room, there are a number of disadvantages to such an arrangement. For example, having only one treatment room in which such procedures can be performed creates significant logistics problems.

Another example is the use of lasers in forensic analysis, particularly blood and fingerprint analysis. In this application, the user, typically a law enforcement officer, must carry the laser system to a crime scene to aid in analysis. Current systems weigh a substantial amount, typically 50 lbs. or more, and make portability a significant issue.

Although a single unit with a laser head and power supply mounted side by side is more mobile and lends itself more readily to applications such as curing of dental restorative compounds, it too has disadvantages. The limited space available in a dental office may cause problems in moving and setting up such a bulky unit.

Accordingly, it would be an advantage over the prior art to provide a small, lightweight, integral laser head and power supply system which could be easily transported for use at different locations.

SUMMARY AND OBJECTS OF THE INVENTION

It is a primary object of this invention to provide a small, lightweight laser head and power supply system.

It is an additional object of this invention to provide a rugged laser head and power supply system.

It is a further object of this invention to provide a laser head and power supply system which is highly portable.

It is a still further object of this invention to provide a laser head and power supply system which will readily lend itself to emerging medical and dental procedures as well as display and forensic applications by being easily transportable.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein the present invention utilizes an integral laser head and power supply system design. This integral system comprises an integrated power supply and laser head which have been designed to allow integration. The laser head resides on the main circuit board with the associated electronics positioned around the laser head and sharing the same support structure. In addition, a heat sink is positioned around the laser head so as to provide additional integration of the laser head and power supply.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawing depict only a typical embodiment of the invention and are not therefore to be considered to be limiting of its scope, the invention will be described and explained with additional specificity and detail through the use of the accompanying drawings in which:

FIG. 4 is a cross sectional view of the integral laser head and power supply system depicting an air cooling system utilizing air pulled into the integral laser head and power supply system.

DETAILED DESCRIPTION OF THE PREFERRED EMBODIMENTS

The differing heat dissipation requirements of the laser head and power supply is believed to have contributed to the historical development of the traditional configuration utilizing a separate power supply and laser head. In the present invention, the traditional design of separate power supply and laser head has been reassessed.

With the goal of a small single unit in mind, the integration of power supply and laser head presents a possible solution. In order to accomplish this, the power supply and laser head must be designed to compliment each other such that the laser head can be mounted integrally within the power supply.

Although the laser head produces significant heat and can run at temperatures higher than that at which a power supply can operate, it is possible to cool the entire system in such a way that the power supply remains cool enough to operate. This is true even though the power supply resides in close proximity with the laser head.

Reference is now made to the embodiments illustrated in FIGS. 1–4 wherein like numerals are used to designate like parts throughout. A currently preferred embodiment of the inventive integral laser head and power supply system is depicted as a small single unit and generally designated at 10 in FIG. 1.

Figure 1:
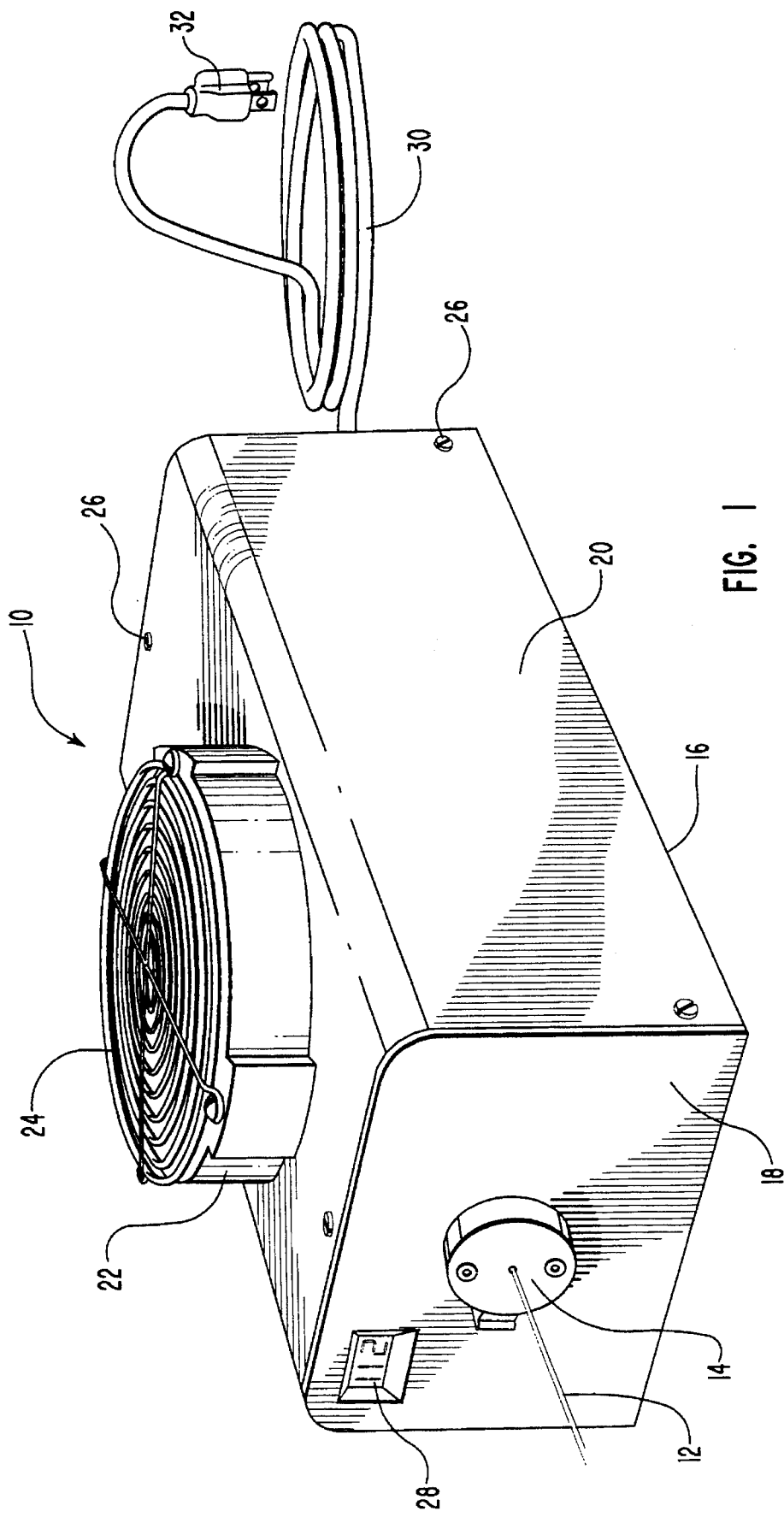
FIG. 1 is a perspective view of the integral laser head and power supply system.

FIG. 1 shows the system in use with laser beam 12 being emitted from output port 14 located on housing 16. Housing 16 has a front portion 18, a rear portion (not shown), a base portion (not shown) and a cover portion 20. Housing 16 is preferably constructed of a metal material although other materials may be used. Aluminum is a preferred material for use in construction of the housing due to its workability. In addition, front portion 18, the rear portion, the base portion and cover portion 20 may be manufactured of differing materials if advantageous in a particular application or for manufacturing purposes.

It is anticipated that housing 16 will be about 5 inches in height, 14 inches in length and 8 inches in width. This is similar in size to the housing of the laser head or power supply alone in prior art systems. Fan housing 22 and grill 24 is anticipated to add approximately 1.5 inches to the overall height of the unit in applications which utilize an integral fan.

In addition, it is anticipated that unit 10 will weigh approximately 15 lbs. This represents a substantial reduction in weight over typical prior art systems.

Grill 24 may be mounted flush on cover portion 20 if an integral fan is not to be used. In such applications the air required for cooling will be pulled through the system by an outside source, rather than pushed through the system by an integral fan as depicted in this view.

Cover portion 20 is held in place with housing screws 26 which extend through the housing into receptors (not shown) located on the internal structure of the system. Although housing screws 26 are the preferred method of securing cover portion 20 in place, other attachment methods could be utilized successfully. For example, a more permanent method of attachment such as permanent adhesives could be employed if easy access to the internal portion of the system by the user is not desired.

A display 28, located adjacent to output port 14, is provided for monitoring hours of use of the integral laser head and power supply system. As depicted in this embodiment, the display is preferably a seven segment type, although gauges or any of a number of other types of monitors could be employed.

Power cord 30 having a three prong power plug 32 is connected through housing 16 to the power supply (not shown) housed within the unit. It is anticipated that unit 10 will preferably interface with a 110 volt power source. In another embodiment, a power cord for interfacing to a 220 volt power source is also envisioned. As will be appreciated, other power sources might be utilized, depending on the precise application, without significantly affecting the design of the present invention.

Figure 2:
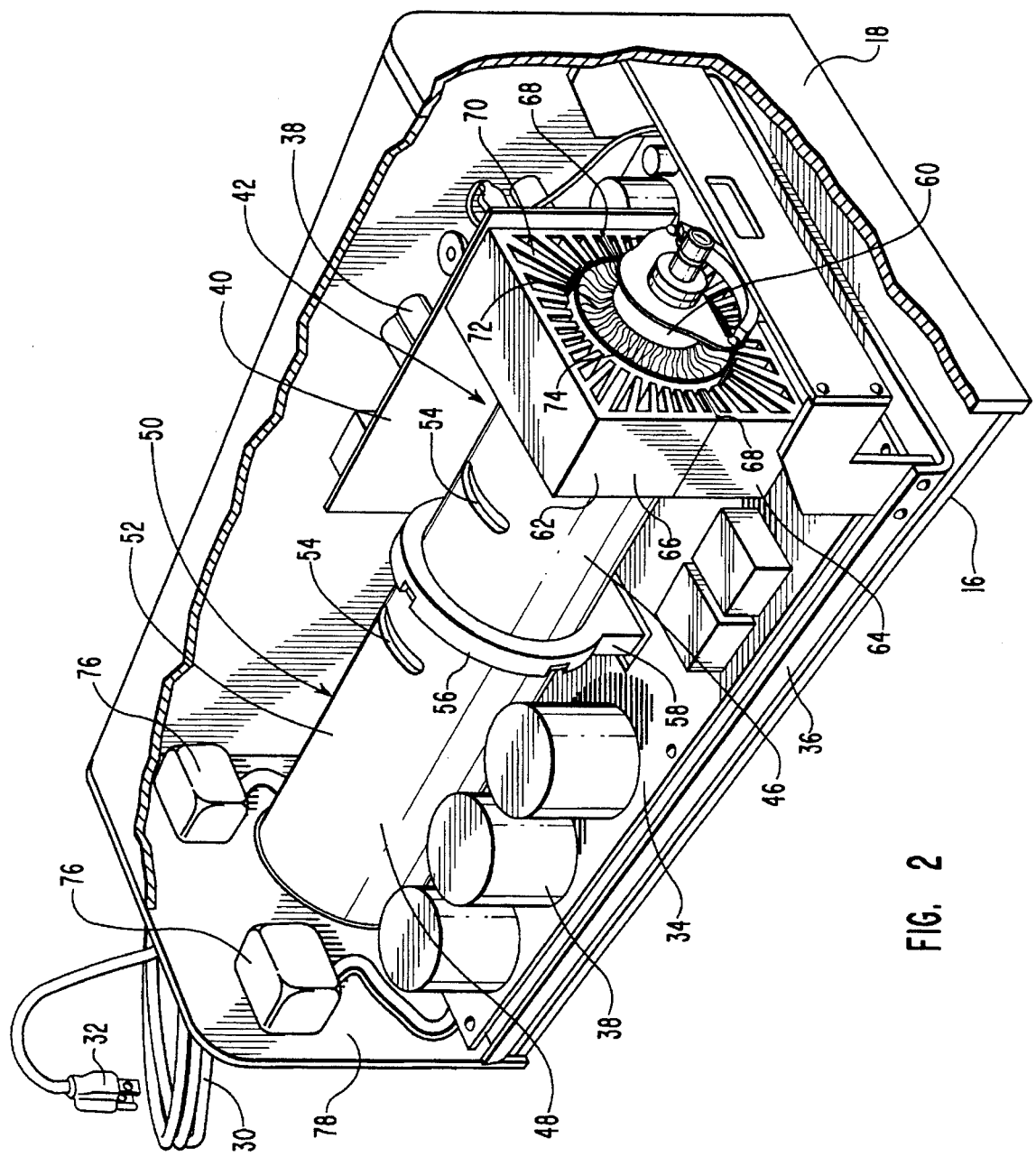
FIG. 2 is a perspective view of the integral laser head and power supply system with a substantial portion of the cover cut away to show the internal configuration.

The embodiment depicted in FIG. 2 is a preferred embodiment in part because it is a simplified design utilizing consolidated electronics and technologically advanced components. This configuration provides for a low cost rugged design having high performance.

The internal configuration of unit 10 can best be seen in FIG. 2 and 4. As depicted, a main circuit board 34 rest on the base portion 36 of unit 10. Main circuit board 34 incorporates a variety of electronics 38 associated with the laser head and power supply, including, in this embodiment, an auxiliary circuit board 40. Main circuit board 34 will preferably incorporate switching transistors, typically FET's, as well as an input bridge, typically diodes, and a filament supply.

As will be appreciated, the precise location of specific electronics, except those which require heat dissipation, is not critical. The design of the circuit board to be so sized and configured as to allow the placement of laser head 42 thereon is, conversely, required to allow for the integration of the laser head and power supply of the present invention.

Electronic components must be positioned alongside or underneath laser head 42 in such a way that those particularly susceptible to heat are ensured adequate cooling. Additionally, those which require heat dissipation must be located in close proximity to the power supply heat sink 62. Serviceability may also be a consideration in determining electronic placement.

Laser head 42 has an anode end 46, a cathode end 48 and incorporates plasma tube 50. Plasma tube 50 is preferably constructed of a ceramic material. Ceramic materials are rugged while providing electrical isolation and being able to withstand the high temperatures and other conditions associated with the operation of plasma tube 50.

Exterior shell 52 of plasma tube 50 creates a cooling conduit for air flow therethrough. Exterior shell 52 is preferably constructed of phenolic material such as canvas, linen, and fiberglass weave.

Slits 54 can be incorporated in the exterior shell 52 of plasma tube 50 to allow for controlled release of heated air if so desired.

Mounting ring 56 is designed to surround plasma tube 50 and provide a mounting pedestal 58 which protrudes through main circuit board 34. Mounting ring 56 is preferably constructed of phenolic material such as canvas, linen, or fiberglass weave.

Anode 60 positioned at anode end 46 of plasma tube 50 is preferably constructed of solid copper. The solid copper design of anode 60 enhances the efficiency and stability of the system. It will be understood, however, that anode 60 could be manufactured of other materials: solid nickel and iron alloy, or other low expansion alloys.

In this embodiment, hard sealed integral internal mirrors (not shown) comprise the resonator. External mirrors (not shown) could also be employed. In addition, a system incorporating an internal and an external mirror is contemplated as an alternative embodiment.

Positioned circumferentially around anode end 46 of plasma tube 50 is power supply heat sink 62. Power supply heat sink 62 is designed to provide heat dissipation for the power supply. Heat sink 62 is preferably constructed of anodized aluminum and is formed in two halves. Bottom half 64 and top half 66 are joined via pin 68.

Laser head heat sink 72 is positioned circumferentially around anode end 46 of plasma tube 50 between plasma tube 50 and power supply heat sink 62. Laser head heat sink 72 and power supply heat sink 62 are separated by an air gap 74. Air gap 74 is anticipated to be approximately ⅛. Positioned in air gap 74 to further electrically separated laser head heat sink 72 and power supply heat sink 62 is a highly electrically insulating material in paper form.

This additional electrical insulation helps to preclude interaction particularly on bringing up the laser. In ion lasers, to bring the laser up requires approximately a 5 k.V. pulse, this can cause arcing if the electrical insulation is inadequate. Further, incorporation of an insulating paper helps to discourage contaminants, which may also cause arcing, from collecting in air gap 74.

Cooling air flows axially along plasma tube 50 and through fins 70 of heat sink 62. This unique integration of power supply and laser head to form a single cooling conduit enhances the construction of the inventive laser head and power supply system of the present invention.

Positioning heat sink 72 at the anode end 44 of laser head 42 is advantageous since, although anode end 46 requires cooling it requires less than the remainder of laser head 42. It is contemplated, however, that with appropriate adjustments in air flow path, heat sink 72 could be positioned at various locations along laser head 42.

In addition, it is contemplated that additional heat sinks could be positioned along laser head 42 if desired or necessary as shown in FIG. 4. For example, a heat sink could be placed circumferentially around cathode end 48 of laser head 42 in addition to heat sink 72 placed circumferentially around anode end 46 as shown. An air flow path could be designed such that air would flow through the fins of both of heat sinks as well as axially along the length of plasma tube 50.

Also visible in this view are control housings 76 which would correspond to monitoring displays or controls located on the outfacing side of the rear portion 78 of housing 16. The types of controls which would be located on the outfacing side of the rear portion 78 of housing 16 would typically include a main power switch, key switch, power control knob, remote interlock, remote control interface, and emission indicator. As will be appreciated, the precise controls necessary or advantageous to a specific application will vary.

Figure 3:
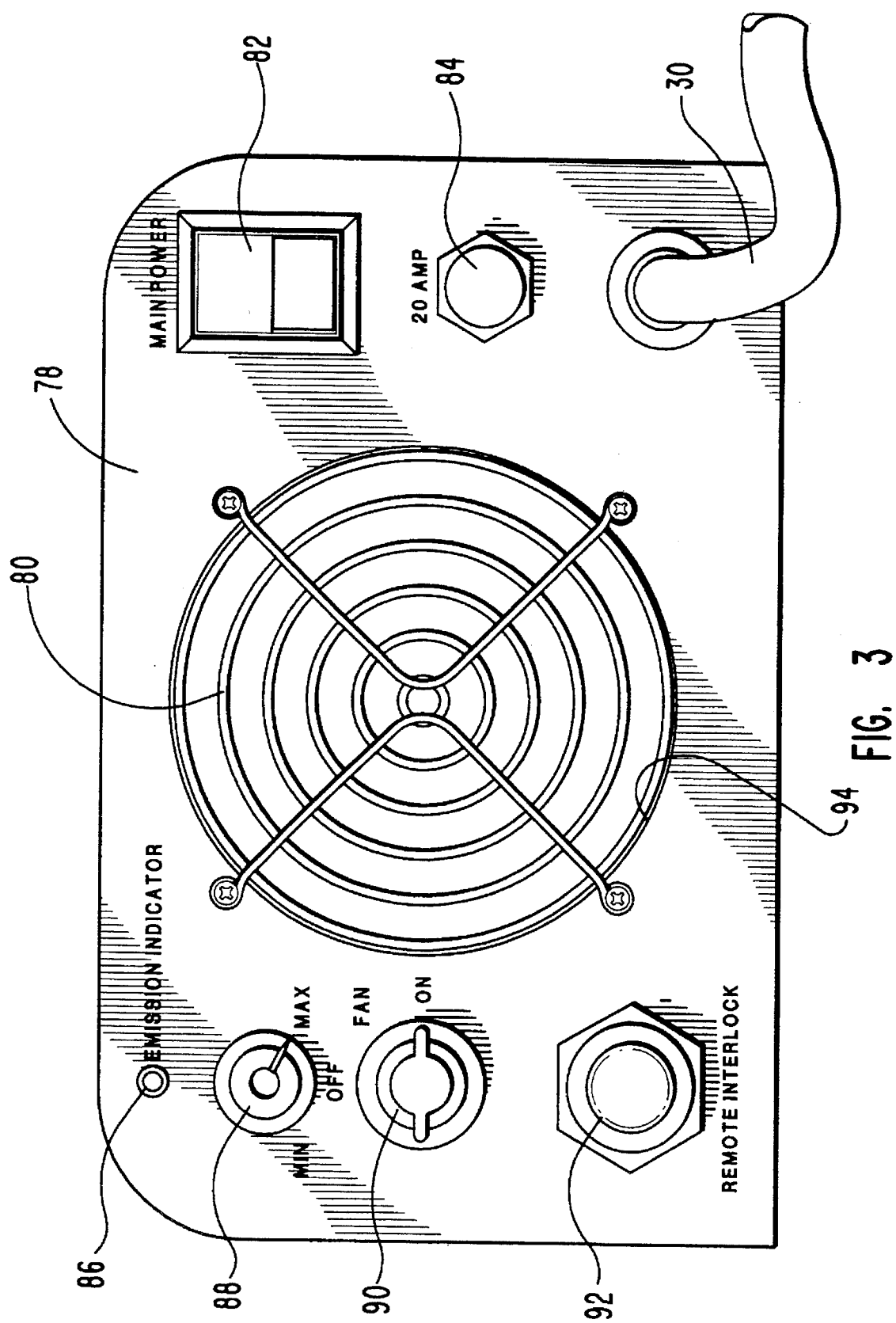
FIG. 3 is an end view of the integral laser head and power supply system depicting a typical controls configuration.

FIG. 3 depicts a presently preferred configuration for system controls. The controls, positioned on the outfacing side of rear portion 78 surrounding rear grill 80, are designed to provide a user with optimum control in a convenient configuration. Included are a main power switch 82, fuse replacement port 84, emissions indicator 86, power adjustment knob 88, key switch 90, and remote control interface 92.

Rear grill 80 covers air port 94 and can be used for connection to a remotely located cooling fan. In such a configuration a tube (not shown) would be connected over rear grill 80 and would extend to the remotely located cooling fan (not shown). Air would be drawn through the system, out through rear grill 80, and finally through the remotely located fan to be expelled. An advantage of this arrangement is that the remote location of the fan results in minimization of vibration of unit 10. Further the present invention requires only a single tube and a remotely located cooling fan as opposed to prior art systems which would require a separate tube and cooling fan for the laser head and for the power supply.

FIG. 4 depicts the air flow paths when using an integral fan. In this view, the rotor 96 and fins 98 of fan 100 are visible inside fan housing 22. FIG. 4 indicates the air flow path when fan 100 is being utilized to draw air into housing 16 through air port 104 via fan 100 and exhausted through rear exhaust air port 104 and grill 80. As can be seen air enters through air port 104 via fan 100 and is directed along plasma tube 50 toward anode end 46. Reaching front portion 18 of housing 16, the air flow turns and is directed through the fins of heat sink 62 and toward cathode end 48, wherein resides cathode 102, along plasma tube 50. Air is then exhausted through exhaust air port 94 and rear grill 80 to the outside environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An integral laser head and power supply system comprising:
    a. a housing having an air port to enable air to be directed into said housing through said air port and having an exhaust air port for exhaustion of air to the environment;
    b. a power supply within said housing, said power supply receiving power from a power source and including electronic components;
    c. a laser head within said housing and powered by said power supply, said laser head having an anode contained within an anode end of said laser head and a cathode contained within a plasma tube extending from said laser head, said plasma tube extending within said housing and being in communication with said exhaust air port to exhaust air from said plasma tube to the environment;
    d. a laser head heat sink circumferentially disposed around said anode end of said laser head;
    e. a power supply heat sink circumferentially disposed around said laser head heat sink, said power supply heat sink being in sufficiently close proximity to said electronic components of said power supply for dissipation of heat to said power supply heat sink to ensure that said electronic components remain adequately cool, and said power supply heat sink being in communication with said plasma tube;
    f. a cooling conduit defined by said air port, said housing, said power supply heat sink, said plasma tube and said exhaust air port; and
    g. a fan in communication with said cooling conduit to direct air flow through said cooling conduit to remove heat from said power supply and said laser head by directing air through said cooling conduit and exhausting the air to the environment.

2. An integral laser head and power supply system as defined in claim 1, wherein said fan is mounted to said housing and is in communication with said air port.

3. An integral laser head and power supply system as defined in claim 1, wherein said fan is a remotely located cooling fan in communication with said exhaust air port.

4. An integral laser head and power supply system as defined in claim 1, wherein said laser head heat sink and said power supply heat sink are separated by an air gap.

5. An integral laser head and power supply system as defined in claim 1, wherein said laser head heat sink and said power supply heat sink are separated by an insulation material in an air gap between said laser head heat sink and said power supply heat sink.

6. An integral laser head and power supply system as defined in claim 1, said power supply heat sink having fins to enable air to flow through said power supply heat sink from said housing to said plasma tube.

7. An integral laser head and power supply system comprising:
    a. a housing having an air port with a fan mounted on said housing to direct air into said housing through said air port and having an exhaust air port for exhaustion of air to the environment;
    b. a power supply within said housing, said power supply receiving power from a power source and including electronic components;
    c. a laser head within said housing and powered by said power supply, said laser head having an anode contained within an anode end of said laser head and a cathode contained within a plasma tube extending from said laser head, said plasma tube extending within said housing and being in communication with said exhaust air port to exhaust air from said plasma tube to the environment;
    d. a laser head heat sink circumferentially disposed around said anode end of said laser head;
    e. a power supply heat sink circumferentially disposed around said laser head heat sink, said power supply heat sink being in sufficiently close proximity to said electronic components of said power supply for dissipation of heat to said power supply heat sink to ensure that said electronic components remain adequately cool, and said power supply heat sink being in communication with said plasma tube, whereby air is directed via said fan through said air port into said housing then through said power supply heat sink into said plasma tube and finally out of said exhaust air port to the environment to remove heat from said power supply and said laser head.

8. An integral laser head and power supply system as defined in claim 7, wherein said laser head heat sink and said power supply heat sink are separated by an air gap.

9. An integral laser head and power supply system as defined in claim 7, wherein said laser head heat sink and said power supply heat sink are separated by an insulation material in an air gap between said laser head heat sink and said power supply heat sink.

10. An integral laser head and power supply system as defined in claim 7, said power supply heat sink having fins to enable air to flow through said power supply heat sink from said housing to said plasma tube.

11. An integral laser head and power supply system comprising:
    a. a housing having an air port to enable air to be drawn into said housing through said air port and having an exhaust air port for exhaustion of air to the environment;
    b. a power supply within said housing, said power supply receiving power from a power source and including electronic components;
    c. a laser head within said housing and powered by said power supply, said laser head having an anode contained within an anode end of said laser head and a cathode contained within a plasma tube extending from said laser head, said plasma tube extending within said housing and being in communication with said exhaust air port to exhaust air from said plasma tube to the environment;
    d. a laser head heat sink circumferentially disposed around said anode end of said laser head;

e. a power supply heat sink circumferentially disposed around said laser head heat sink, said power supply heat sink being in sufficiently close proximity to said electronic components of said power supply for dissipation of heat to said power supply heat sink to ensure that said electronic components remain adequately cool, and said power supply heat sink being in communication with said plasma tube; and f. a remotely located cooling fan in communication with said exhaust air port whereby air is directed via said fan through said air port into said housing then through said power supply heat sink into said plasma tube and finally out of said exhaust air port to the environment to remove heat from said power supply and said laser head.

12. An integral laser head and power supply system as defined in claim 11, wherein said laser head heat sink and said power supply heat sink are separated by an air gap.

13. An integral laser head and power supply system as defined in claim 11, wherein said laser head heat sink and said power supply heat sink are separated by an insulation material in an air gap between said laser head heat sink and said power supply heat sink.

14. An integral laser head and power supply system as defined in claim 11, said power supply heat sink having fins to enable air to flow through said power supply heat sink from said housing to said plasma tube.

* * * * *